H. J. GILBERT.
BUSHING.
APPLICATION FILED FEB. 8, 1904.
907,989.
Patented Dec. 29, 1908.
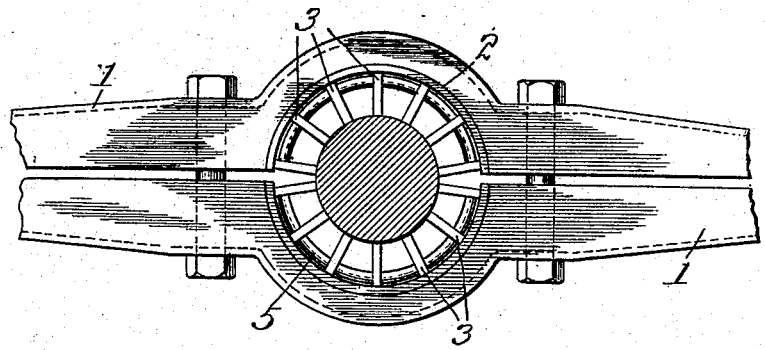
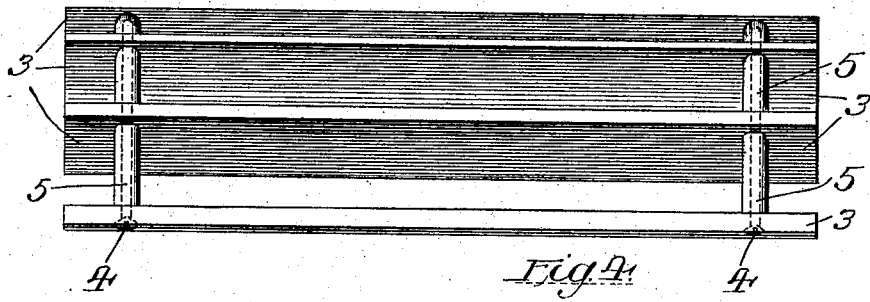
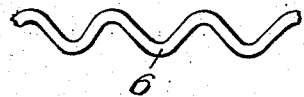
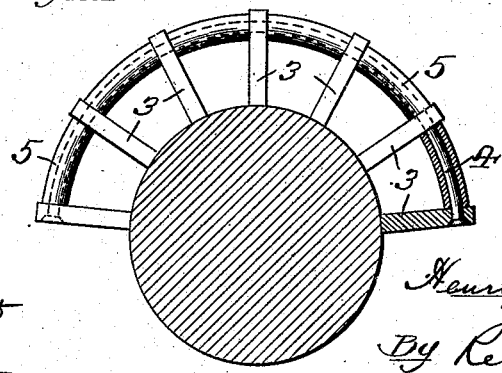

UNITED STATES PATENT OFFICE.

HENRY J. GILBERT, OF SAGINAW, MICHIGAN.

BUSHING.

No. 907,989.           Specification of Letters Patent.           Patented Dec. 29, 1908.

Application filed February 8, 1904. Serial No. 192,701.

*To all whom it may concern:*

Be it known that I, HENRY J. GILBERT, a citizen of the United States, residing at Saginaw, Saginaw county, Michigan, have invented certain Improvements in Bushings, of which the following is a description.

My invention has relation to bushings particularly, but not necessarily, applicable to pulleys and the like, where interchangeable bushings are required to enable any size of pulley having a given shaft bore or opening, which is generally of standard diameter, to be inserted and clamped upon a shaft of any diameter less than such shaft bore or opening.

The object of my invention is to provide a simple, efficient and reliable bushing of novel and original construction, as will be understood from the description hereinafter given.

In the drawing, Figure 1 is a side elevation of the spoke portion of a pulley illustrating the usual shaft bore or opening in which my novel form of bushing has been inserted; Fig. 2 is a side elevation (on a scale larger than in Fig. 1) of one of the halves of my bushing; Fig. 3 an end elevation of my bushing, partly in section, and Fig. 4 a plan of a corrugated form of bar or strip.

For the purpose of affording a clear and comprehensive understanding of my invention, I have shown my bushing in connection with a sheet metal pulley, although its application is not limited thereto. As matter of fact, I contemplate using my invention wherever applicable.

As herein shown, the pulley is of the split type having the spoke arms 1 which are expanded at their central portion to form the usual shaft bore or opening 2 within which may be inserted, if desired, a plain shell, in two halves, forming a hub thimble.

The bushing, now to be described, is made in two similar halves to accommodate the split character of the pulley itself. Each half bushing is made as a unit, as shown in Figs. 2 and 3, comprising a series of longitudinal metal bars or strips 3, preferably sheet metal, by preference arranged radially of the longitudinal axis of the shaft and consequently radially of the axis of rotation. These bars or strips, which by preference are flat as shown, have inner and outer bearing surfaces, the former of which are presented to the shaft itself, Fig. 3, and the latter to the hub structure or shaft bore of the pulley.

In order to secure and maintain the bars or strips in their proper relative position as described, a plurality of curved rods or wires 4, preferably two, as herein shown, are passed through holes or openings in the strips intermediate their inner and outer bearing surfaces. The end bars or strips may be secured to the wires or rods in any suitable manner, as for instance by riveting the rods thereto, as herein shown.

To properly space or distance the respective strips a series of distance tubes or sleeves 5 are strung on the wires or rods 4 and between the strips. Any desired number of the strips may be employed and the same may be spaced apart any distance according to the length of distance sleeve.

As hereinbefore stated, my bushing comprises two of the halves just described, which are each slightly less than a semicircle so as not to come in contact with each other when the pulley is clamped to the shaft.

Bushings made in accordance with my invention as above described are light but durable and also efficient and comparatively inexpensive.

It will be understood that various mechanical changes may be made in respect to the form and construction illustrated and described without departing from the spirit and scope of my invention and claims.

As hereinbefore stated, the bars or strips are preferably flat, as shown in Figs. 1, 2 and 3, but if desired the bars or strips may partake of other forms or shapes, as for instance the same may be corrugated, as indicated by the bars 6 in Fig. 4.

I claim:

1. A bushing comprising a series of bars or strips arranged longitudinally of the axis of the bushing and having bearing surfaces concentric to such axis, and means for rigidly holding such strips in proper position relative to each other and to said axis; substantially as described.

2. A bushing comprising a series of bars or strips arranged longitudinally of the axis of the bushing and having their opposite sides or edges of unequal width and having their narrower edges arranged concentric to such axis and serving as bearing surfaces; substantially as described.

3. A bushing comprising a series of bars or strips arranged longitudinally of the axis of the bushing and having inner and outer bearing surfaces concentric to such axis, means for rigidly holding said strips in said position and in proper relation one with the other, and means for distancing such strips; substantially as described.

4. A bushing comprising a series of bars or strips arranged longitudinally of the axis of the bushing and having inner and outer bearing surfaces concentric to such axis, curved wires or rods passing through said strips for holding them in proper relative position, and means for distancing said strips; substantially as described.

5. A bushing comprising a series of bars or strips arranged longitudinally of the axis of the bushing and having inner and outer bearing surfaces concentric to such axis, and curved wires or rods passing through said strips and secured to the end ones thereof; substantially as described.

6. A bushing comprising a series of bars or strips arranged longitudinally of the axis of the bushing and having inner and outer bearing surfaces concentric to such axis, curved wires or rods passing through said strips and secured to the end ones thereof, and means for distancing the strips; substantially as described.

7. A bushing comprising a series of bars or strips arranged logitudinally of the axis of the bushing and having inner and outer bearing surfaces concentric to such axis, curved wires or rods passing through said strips and secured to the end ones thereof, and a series of distance sleeves strung on such rods between the strips for distancing the latter; substantially as described.

8. A half bushing comprising a series of bars or strips arranged in a substantial semi-circle longitudinally of the axis of the bushing with their narrow edges arranged to be presented to a shaft, and means for rigidly holding said strips in proper position; substantially as described.

9. A half bushing comprising a series of bars or strips arranged in a substantial semi-circle longitudinally of the axis of the bushing with their narrow edges arranged to be presented to a shaft, and semi-circular rods passing through said strips and secured to the outermost ones thereof; substantially as described.

10. A half bushing comprising a series of bars or strips arranged in a substantial semi-circle longitudinally of the axis of the bushing with their narrow edges arranged to be presented to a shaft, semi-circular rods passing through said strips and secured to the outermost ones thereof, and distance sleeves strung on such rods between the strips for distancing the latter; substantially as described.

11. A bushing comprising a series of bars or strips arranged longitudinally of the axis of the bushing and of rectangular shape in cross section with their pairs of opposite sides of unequal size, said strips having their narrower sides or edges concentric to such axis and directed towards the bushing axis, and rods bent to a circle and passing through the opposite wider sides of all of the strips; substantially as described.

HENRY J. GILBERT.

Witnesses:
 H. MEAD HAMMOND,
 ARNOLD BOUTELL.